July 21, 1953    HIROSHI ITO    2,645,973
HIGH APERTURE FOUR COMPONENT OBJECTIVE OF THE GAUSS TYPE
Filed June 29, 1951
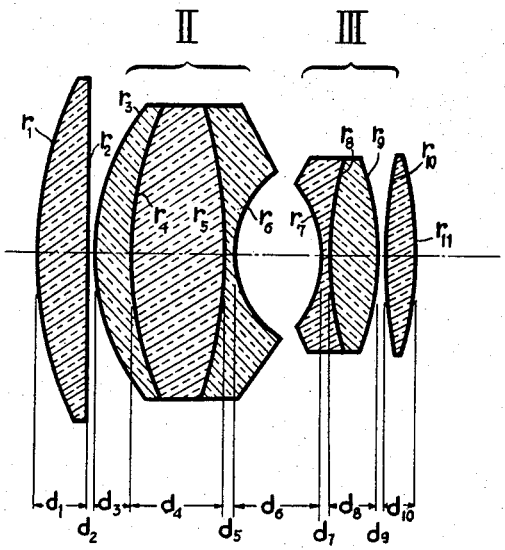
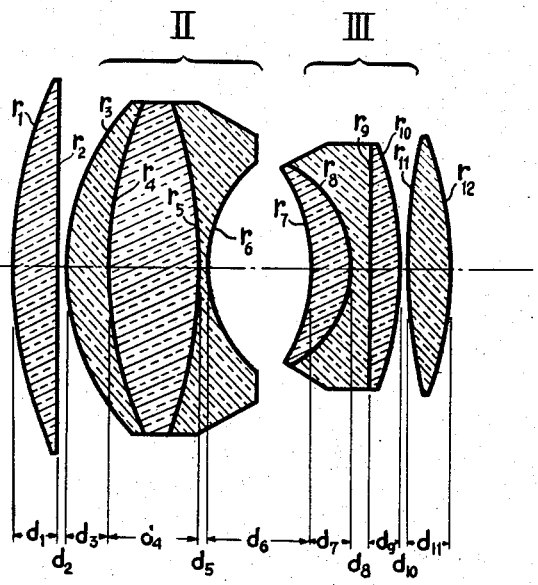
INVENTOR
HIROSHI ITO
BY
HIS ATTORNEY Patented July 21, 1953

2,645,973

UNITED STATES PATENT OFFICE 2,645,973

HIGH APERTURE FOUR COMPONENT OBJECTIVE OF THE GAUSS TYPE

Hiroshi Ito, Setagaya-ku, Tokyo, Japan, assignor to Canon Camera Company, Ltd., Chuouku, Tokyo, Japan, a corporation of Japan Application June 29, 1951, Serial No. 234,354
In Japan January 31, 1951

7 Claims. (Cl. 88—57)

The present invention relates to an improved high aperture objective of Gauss type for use in a camera.

The object of the present invention is to provide such a camera lens with highest resolving power and aperture and free of oblique spherical aberration (i. e., coma) throughout the image plane with an including field of some 30 degrees.

The means to remove the spherical aberration from an objective of Gauss type and increase its aperture is so simple that there are already in existence several such objectives whose aperture is above F:1.5. However, a common defect in these lenses is that it is next to impossible to remove the oblique spherical aberration throughout the picture area with the result that when any such lens system used in a state of open stop, the picture is subject to considerable unpleasant shading-off. This remarkably lowers its resolving power when a photograph is taken of an object with low contrast. In the present invention, there is applied to the lens system of some 30° including field, a principle similar to that disclosed in my copending U. S. application 234,353, filed June 29, 1951, whereby the above-mentioned common defect of prior known photographic objectives of the Gauss type is removed, to produce the objective of the instant invention having both a high aperture and a very high resolving power.

In accordance with the instant invention, of two cemented lenses of meniscus shape situated opposite to each other across the stop, the one on the object-side shall act in concave manner to correct spherical aberration on the axis, while the meniscus lens on the picture-side shall act in convex manner, as is the case in the objective disclosed in the above-mentioned copending application. In the present invention, the refractive power $$\left(\frac{n'-n}{r}\right)$$

of the last cemented face of the cemented meniscus object-side compound lens and that of the first cemented face of the meniscus image-side compound lens, are respectively greater in absolute value than −0.08 and 0.18 when the refractive power of the total lens system is unity. Furthermore with the inventive lens with some 30° including field, the Petzval sum should be held at a minimum, and for that purpose, studies have clarified that it is most advantageous for the cemented object-side compound meniscus lens to be composed of preferably three single lenses. Further the inventor has confirmed that for the purpose of removing oblique spherical aberration, the radius of curvature of the first face of the cemented image-side compound meniscus lens, that is the concave face facing to the stop, should be, in its absolute value, from 0.25 to 0.45 fold of the focal length, and that the axial thickness of the cemented object-side compound meniscus lens should be larger than 0.25 fold of the focal length.

The foregoing and other objects and features of the invention will be understood more fully and clearly from the following detailed description of two illustrative embodiments thereof taken in connection with the appended drawing in which:

Figure 1 is an axial section through the lenses of the first illustrative embodiment of the objective of the invention in which the front meniscus compound lens consists of three cemented lenses; and Figure 2 is an axial section through the lenses of the second illustrative embodiment of the objective of the invention in which both the front and rear meniscus compound lenses each consist of three cemented lenses.

The objective of Figure 1 consists of four lens units, I, II, III and IV, axially aligned and separated from each other by air spaces $d_2$, $d_6$ and $d_9$ respectively. The front lens unit I is a single positive lens $L_1$ of axial thickness $d_1$ and of a front radius $r_1$ and a rear radius $r_2$. The second lens unit II is a compound lens having two positive lenses $L_2$ and $L_3$, of axial thickness $d_3$, front radius $r_3$ and rear radius $r_4$, respectively, $d_4$, $r_4$ and $r_5$, cemented to each other on $r_4$, and dispersive lens $L_4$ of axial thickness $d_5$ and a front radius $r_5$ and a rear radius of $r_6$ cemented to lens $L_3$ along the surfaces of radius $r_5$. The third lens unit III consists of a dispersive lens $L_5$ having an axial thickness $d_7$, a front surface of curvature $r_7$, the latter surface being axially spaced at $d_6$ from the rear surface of unit II, and a rear radius $r_8$, to which rear surface of lens $L_5$ is cemented the collective lens $L_6$ having a front surface of radius $r_8$, a rear surface of radius $r_9$ and an axial thickness of $d_8$. Axially spaced the distance $d_9$ from the rear surface of lens $L_6$ is the positive lens $L_7$ of axial thickness $d_{10}$ and of a front radius $r_{10}$ and a rear radius $r_{11}$.

The constructional data of the coma corrected objective of this invention of my first illustrative embodiment, for a focal length of 1.00, an including field of 30 degrees and aperture of F/1.5, including the refractive indices $n_D$ of the individual lenses and the Abbé numbers V thereof, is as follows, where the plus sign before a radius indicates the radius has a curvature convex toward the front, that is object side, of the objective and the minus sign indicates curvature concave the front:

|   | $r$ | $d$ | L | $n_D$ | V |
|---|---|---|---|---|---|
| I | $r_1 = 0.822$ | $d_1 = 0.105$ | $L_1$ | 1.6228 | 56.9 |
|   | $r_2 = 9.500$ | $d_2 = 0.002$ |   |   |   |
| II | $r_3 = 0.440$ | $d_3 = 0.085$ | $L_2$ | 1.6385 | 55.5 |
|   | $r_4 = 0.805$ | $d_4 = 0.190$ | $L_3$ | 1.5163 | 64.0 |
|   | $r_5 = -1.850$ | $d_5 = 0.020$ | $L_4$ | 1.6889 | 31.1 |
|   | $r_6 = 0.252$ | $d_6 = 0.190$ |   |   |   |
| III | $r_7 = -0.310$ | $d_7 = 0.015$ | $L_5$ | 1.5317 | 48.9 |
|   | $r_8 = 0.572$ | $d_8 = 0.103$ | $L_6$ | 1.6584 | 50.8 |
|   | $r_9 = -0.440$ | $d_9 = 0.002$ |   |   |   |
| IV | $r_{10} = 1.500$ | $d_{10} = 0.060$ | $L_7$ | 1.6385 | 55.5 |
|   | $r_{11} = -0.846$ |   |   |   |   |

The objective of Figure 2 similarly comprises four lens units I, II, III and IV similarly air spaced and aligned axially, with the difference that unit III of this embodiment here consists of three lenses cemented to each other. The constructional data for an illustrative embodiment of a focal length of 1.00, an including field of 25 degrees, and an aperture of F:1.4, is as follows:

|   | $r$ | $d$ | L | $n_D$ | V |
|---|---|---|---|---|---|
| I | $r_1 = 0.855$ | $d_1 = 0.105$ | $L_1$ | 1.6204 | 60.3 |
|   | $r_2 = \infty$ | $d_2 = 0.002$ |   |   |   |
| II | $r_3 = 0.440$ | $d_3 = 0.085$ | $L_2$ | 1.6386 | 55.5 |
|   | $r_4 = 0.900$ | $d_4 = 0.178$ | $L_3$ | 1.5163 | 64.0 |
|   | $r_5 = -1.790$ | $d_5 = 0.020$ | $L_4$ | 1.6727 | 32.2 |
|   | $r_6 = 0.247$ | $d_6 = 0.190$ |   |   |   |
| III | $r_7 = -0.304$ | $d_7 = 0.069$ | $L_5$ | 1.5891 | 61.2 |
|   | $r_8 = -0.227$ | $d_8 = 0.039$ | $L_6$ | 1.5263 | 51.0 |
|   | $r_9 = -5.710$ | $d_9 = 0.058$ | $L_7$ | 1.6385 | 55.5 |
|   | $r_{10} = -0.539$ | $d_{10} = 0.003$ |   |   |   |
| IV | $r_{11} = 1.300$ | $d_{11} = 0.065$ | $L_8$ | 1.6385 | 55.5 |
|   | $r_{12} = -0.689$ |   |   |   |   |

What I claim is:

1. A coma corrected high aperture objective of maximum resolving power comprising a pair of collective lenses enclosing an object-side meniscus compound lens and an image-side meniscus compound lens, the four lenses being axially aligned and air separated, in which the object-side compound lens consists of three individual lenses having respective adjacent faces of the same curvature cemented to each other, the cemented surface thereof nearest the image side of the objective having a curvature concave to the object side of the objective, and the image-side meniscus lens consists of at least two individual lenses having respective adjacent faces of the same curvature and cemented to each other, the object side concave surface of the image-side meniscus compound lens has a radius of from 0.25 to 0.45 times in its absolute value the focal length of the objective, and the axial thickness of the object-side meniscus compound lens is between 0.25 and 0.295 times the total focal length of the objective.

2. An objective according to claim 1 in which for a refractive power of unity of the objective, the refractive power of the cemented surface nearest the image side of the objective of the object-side meniscus compound lens lies between substantially —0.087 and —0.094 in its absolute magnitude, and the refractive power of the cemented surface nearest the object side of the objective of the image-side meniscus compound lens lies between substantially 0.22 and 0.28 in its absolute magnitude.

3. An objective according to claim 1 in which the axial thickness of the object-side compound meniscus lens is between 0.25 and 0.295 times the focal length of the objective and in which, for a refractive power of unity of the objective, the refractive power of the cemented surface nearest the image side of the objective of the object-side meniscus compound lens is from —0.087 to —0.094 in its absolute magnitude while the refractive power of the cemented surface nearest the object side of the objective of the image-side meniscus compound lens is from 0.22 to 0.28 in its absolute magnitude.

4. A coma corrected objective over an including field of 30 degrees comprising two compound meniscus lenses with their concave exterior surfaces toward each other, two collective lenses between which the compound meniscus lenses are positioned axially aligned with intervening air spaces, the numerical data of the objective being substantially as follows, where $r$ is the radius of the lens surface, $d$ the axial distance between successive lens surfaces, $n_D$ the indices of refraction, and V the Abbé numbers of the lens glasses:

[Focal length 1.00  F:1.5  Including field 30°]

| $r$ | $d$ | $n_D$ | V |
|---|---|---|---|
| $r_1 = 0.822$ | $d_1 = 0.104$ | 1.6228 | 56.9 |
| $r_2 = 9.500$ | $d_2 = 0.002$ |   |   |
| $r_3 = 0.440$ | $d_3 = 0.085$ | 1.6385 | 55.5 |
| $r_4 = 0.805$ | $d_4 = 0.190$ | 1.5163 | 64.0 |
| $r_5 = -1.850$ | $d_5 = 0.020$ | 1.6889 | 31.1 |
| $r_6 = 0.252$ | $d_6 = 0.190$ |   |   |
| $r_7 = -0.310$ | $d_7 = 0.015$ | 1.5317 | 48.9 |
| $r_8 = 0.572$ | $d_8 = 0.103$ | 1.6584 | 50.8 |
| $r_9 = -0.440$ | $d_9 = 0.002$ |   |   |
| $r_{10} = 1.500$ | $d_{10} = 0.060$ | 1.6385 | 55.5 |
| $r_{11} = -0.846$ |   |   |   |

5. A coma corrected objective having an including field of 25 degrees comprising two compound meniscus lenses with their concave exterior surfaces toward each other, two collective lenses between which the compound lenses are positioned axially aligned with intervening air spaces, the numerical data being substantially as follows, where $r$ is the radius of the lens surface, $d$ the axial distance between successive lens surfaces, $n_D$ the indices of refraction and $V$ the Abbé numbers of the lens glasses:

[Focal length 1.00   F:1.4   Including field 25°]

| $r$ | $d$ | $n_D$ | $V$ |
|---|---|---|---|
| $r_1 = 0.855$ | | | |
| | $d_1 = 0.105$ | 1.6204 | 60.3 |
| $r_2 = \infty$ | | | |
| | $d_2 = 0.002$ | | |
| $r_3 = 0.440$ | | | |
| | $d_3 = 0.085$ | 1.6385 | 55.5 |
| $r_4 = 0.900$ | | | |
| | $d_4 = 0.178$ | 1.5163 | 64.0 |
| $r_5 = -1.790$ | | | |
| | $d_5 = 0.020$ | 1.6727 | 32.2 |
| $r_6 = 0.247$ | | | |
| | $d_6 = 0.190$ | | |
| $r_7 = -0.304$ | | | |
| | $d_7 = 0.069$ | 1.5891 | 61.2 |
| $r_8 = -0.227$ | | | |
| | $d_8 = 0.039$ | 1.5263 | 51.0 |
| $r_9 = -5.710$ | | | |
| | $d_9 = 0.058$ | 1.6385 | 55.5 |
| $r_{10} = -0.539$ | | | |
| | $d_{10} = 0.003$ | | |
| $r_{11} = 1.300$ | | | |
| | $d_{11} = 0.065$ | 1.6385 | 55.5 |
| $r_{12} = -0.689$ | | | |

6. An objective according to claim 1 in which the axial thickness of the object-side meniscus lens is substantially 0.295 times the total focal length of the objective, the refractive power at the cemented surface nearest the image side of the objective of the object-side meniscus lens is substantially −0.093 in its absolute magnitude, and the refractive power of the cemented surface nearest the object side of the objective of the image-side meniscus lens is substantially 0.221 in its absolute magnitude.

7. An objective according to claim 1 in which the axial thickness of the object-side meniscus lens is substantially 0.283 times the total focal length of the objective, the refractive power at the cemented surface nearest the image side of the objective on the object-side meniscus lens is substantially −0.0874 in its absolute magnitude, and the refractive power at the cemented surface nearest the object side of the objective of the image-side meniscus lens is substantially 0.277 in its absolute magnitude.

HIROSHI ITO.

References Cited in the file of this patent

UNITED STATES PATENTS

| Number | Name | Date |
|---|---|---|
| 1,708,863 | Bertele | Apr. 9, 1929 |
| 1,779,257 | Lee | Oct. 21, 1930 |
| 2,186,621 | Bertele | Jan. 9, 1940 |

FOREIGN PATENTS

| Number | Country | Date |
|---|---|---|
| 786,127 | France | June 3, 1935 |
| 470,522 | Great Britain | Aug. 17, 1937 |
| 553,844 | Great Britain | June 8, 1943 |